US011381628B1

(12) United States Patent
Hesters

(10) Patent No.: US 11,381,628 B1
(45) Date of Patent: Jul. 5, 2022

(54) BROWSER-BASED VIDEO PRODUCTION

(71) Applicant: Hopin Ltd, London (GB)

(72) Inventor: Jan Hesters, Berlin (DE)

(73) Assignee: Hopin Ltd, London (GB)

( * ) Notice: Subject to any disclaimer, the term of this patent is extended or adjusted under 35 U.S.C. 154(b) by 0 days.

(21) Appl. No.: 17/559,234

(22) Filed: Dec. 22, 2021

(51) Int. Cl.
*H04L 65/80* (2022.01)
*H04N 5/265* (2006.01)
*H04N 5/77* (2006.01)
*H04L 65/65* (2022.01)
*H04L 65/1089* (2022.01)
*H04L 65/613* (2022.01)
*H04N 5/278* (2006.01)

(52) U.S. Cl.
CPC .......... *H04L 65/80* (2013.01); *H04L 65/1089* (2013.01); *H04L 65/4092* (2013.01); *H04L 65/608* (2013.01); *H04N 5/265* (2013.01); *H04N 5/278* (2013.01); *H04N 5/77* (2013.01)

(58) Field of Classification Search
CPC ...... G06F 16/30; G06F 16/986; G06F 40/106; G06Q 10/06; G06Q 10/1053; G06Q 20/3221; G06Q 30/0276; G11B 27/34; H04L 12/18; H04L 12/1827; H04L 61/2564; H04L 65/1089; H04L 65/4092; H04L 65/403; H04L 65/608; H04L 65/80; H04L 67/02; H04N 5/265; H04N 5/278; H04N 5/77; H04N 7/15; H04N 19/197; H04N 21/44; H04N 21/47202
USPC ................ 348/14.03, 14.08; 705/14.73, 321; 709/203, 231; 715/772; 725/32, 91
See application file for complete search history.

(56) References Cited

U.S. PATENT DOCUMENTS

| | | | |
|---|---|---|---|
| 6,732,102 B1* | 5/2004 | Khandekar | G06F 16/30 715/764 |
| 10,348,784 B2* | 7/2019 | Qian | H04L 61/2564 |
| 10,986,504 B1* | 4/2021 | Smith | G06Q 20/3221 |
| 2002/0116716 A1* | 8/2002 | Sideman | G11B 27/34 725/86 |
| 2005/0004976 A1* | 1/2005 | Mavrogeanes | H04N 21/47202 709/219 |
| 2005/0021805 A1* | 1/2005 | De Petris | H04N 7/15 709/200 |
| 2008/0184288 A1* | 7/2008 | Lipscomb | G06Q 30/0276 725/32 |
| 2009/0199124 A1* | 8/2009 | Birch | G06Q 10/06 715/772 |
| 2012/0062688 A1* | 3/2012 | Shen | H04L 12/18 348/E7.083 |
| 2013/0060711 A1* | 3/2013 | Dachenhaus | G06Q 10/1053 705/321 |
| 2013/0317919 A1* | 11/2013 | Raman | H04N 19/197 715/753 |

(Continued)

*Primary Examiner* — Gerald Gauthier
(74) *Attorney, Agent, or Firm* — Erise IP, P.A.

(57) ABSTRACT

Systems, methods, and computer-readable media are provided for producing and mixing a video stream based on a predetermined video layout template and a set of selectable video streaming parameters. A plurality of individual video streams is received from a respective plurality of participant users and mixed into a mixed video stream on a mixing server which is distributed to a plurality of viewing users. An authoring server allows an authoring user to configure various video streaming parameters which instruct the mixing and display of the mixed video stream.

20 Claims, 8 Drawing Sheets

(56) References Cited

U.S. PATENT DOCUMENTS

| | | | |
|---|---|---|---|
| 2014/0267571 A1* | 9/2014 | Periyannan | H04L 12/1827 |
| | | | 348/14.08 |
| 2014/0313278 A1* | 10/2014 | Periyannan | H04L 65/403 |
| | | | 348/14.08 |
| 2017/0093828 A1* | 3/2017 | Lupien | H04L 67/02 |
| 2018/0184178 A1* | 6/2018 | Hoeben | G06F 16/986 |
| 2019/0220922 A1* | 7/2019 | Barkas | G06F 40/106 |
| 2020/0344498 A1* | 10/2020 | Lazar | H04N 21/44 |

* cited by examiner

BROWSER-BASED VIDEO PRODUCTION

TECHNICAL FIELD

Embodiments of the invention relate to video production and more specifically to video stream mixing.

Video mixing techniques have been used to provide a mixed video stream composed of two or more video streams. However, it may become difficult to efficiently mix video streams on the fly, for example during a real-time web event or conference communication. Further, it may become difficult to add, remove, and adjust video streams during the mixing process. For example, if a user joins a video call it becomes difficult to change the state of the video stream mixing process to include the new user's video stream data. Many of these difficulties arise because encoding and decoding the video stream is particularly CPU intensive. Additional difficulties are present in displaying the various video streams and adjusting size and video quality during a real-time web event.

SUMMARY

Embodiments of the invention solve the above-mentioned problems by providing systems, methods, and computer-readable media for producing and mixing video streams. In some embodiments, video streams may be mixed and rendered in Hypertext Markup Language (HTML) format using a headless browser such that various elements of the mixed video stream may be easily adjusted based on a set of streaming parameters.

A first embodiment of the invention is directed to a method for producing a video stream, the method comprising receiving a plurality of individual video streams associated with a respective plurality of participant users from a media server, mixing the plurality of individual video streams into a mixed video stream using a mixing server, the mixing server including a headless browser for accessing a web page, providing the mixed video stream including the plurality of individual video streams to a plurality of viewing users via one or more edge servers, generating for display in a graphical user interface one or more video streams of the plurality of video streams based on a predefined video template, the predefined video template comprising a Hypertext Markup Language (HTML) layout, and adjusting the HTML layout based at least in part on a number of participant users in the plurality of participant users.

A second embodiment of the invention is directed to one or more non-transitory computer-readable media storing computer-executable instructions that, when executed by a processor, perform a method for producing a video stream, the method comprising receiving a plurality of individual video streams associated with a respective plurality of participant users from a media server, mixing the plurality of individual video streams into a mixed video stream using a mixing server, the mixing server including a headless browser for accessing a web page, providing the mixed video stream including the plurality of individual video streams to a plurality of viewing users via one or more edge servers, and generating for display in a graphical user interface one or more video streams of the plurality of video streams based on a predefined video template, the predefined video template comprising a Hypertext Markup Language (HTML) layout.

A third embodiment of the invention is directed to one or more non-transitory computer-readable media storing computer-executable instructions that, when executed by a processor, perform a method for producing a video stream, the method comprising receiving a plurality of individual video streams associated with a respective plurality of participant users from a media server, mixing at least a portion of the plurality of individual video streams into a mixed video stream using a mixing server, the mixing server including a headless browser for accessing a web page, rendering, using the headless browser, one or more of the plurality of individual video streams on the web page, recording the plurality of individual video streams and the mixed video stream, providing the mixed video stream including the plurality of individual video streams to a plurality of viewing users via one or more edge servers, and generating for display in a graphical user interface one or more video streams of the plurality of video streams based on a predefined video template, the predefined video template comprising a Hypertext Markup Language (HTML) layout.

Additional embodiments of the invention are directed to adjusting the display of a mixed video stream based on one or more streaming parameters including at least one of a number of participating users, a screen size, and a predefined video layout.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
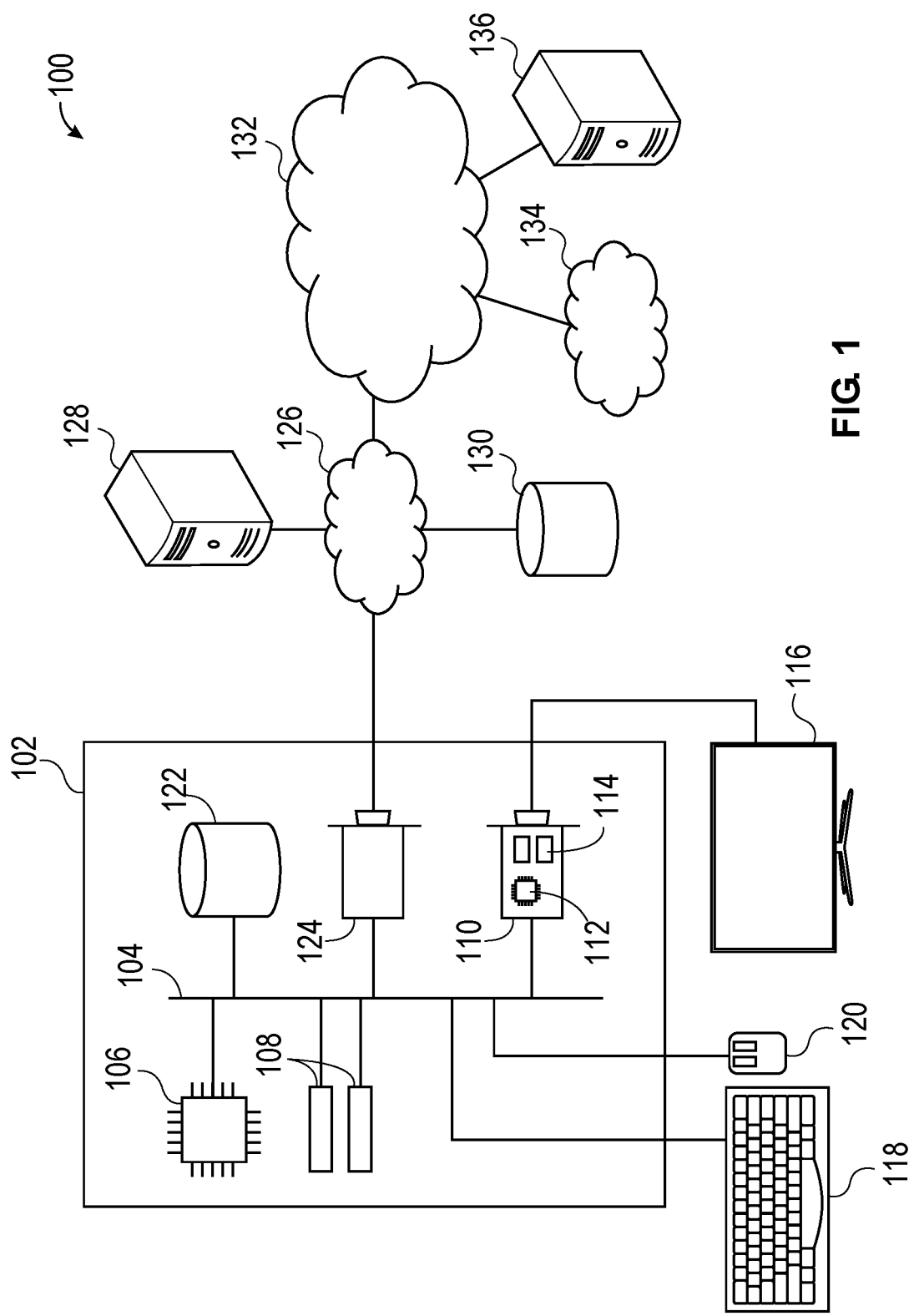
FIG. 1 depicts an exemplary hardware platform relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2A:
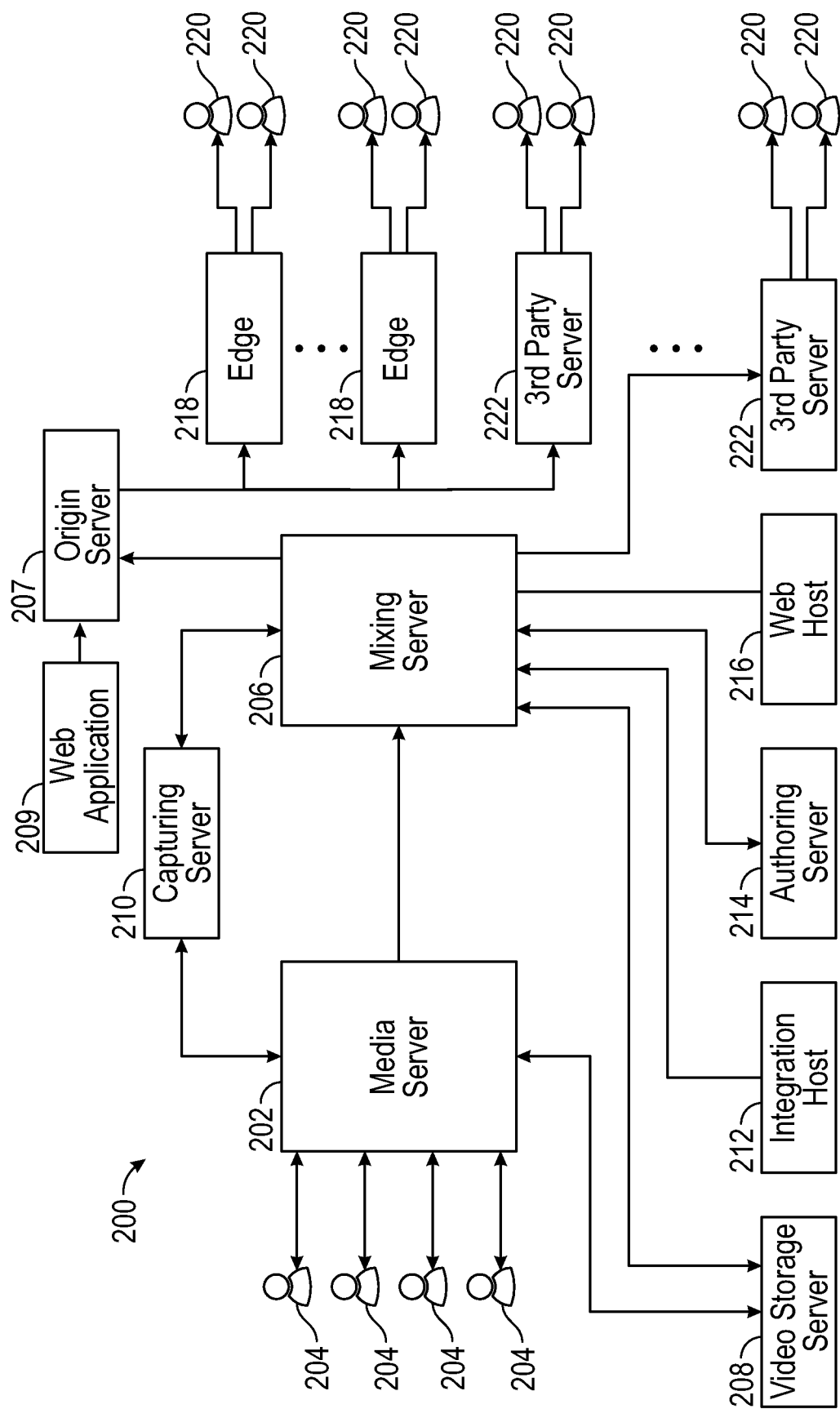
FIG. 2A depicts an exemplary video streaming system relating to some embodiments of the invention.

Turning now to FIG. 2A, an exemplary video streaming system 200 is depicted relating to some embodiments. The video streaming system 200 comprises a media server 202 for receiving and transmitting a plurality of video streams to a plurality of participant users 204. In some embodiments, the participant users 204 may be users participating as presenters in a web conference or another web event. Accordingly, an individual video stream may be received by the media server 202 from each of the participating users 204. In some embodiments, the participating users 204 may record video streams comprising video data and audio data using a camera and microphone respectively. For example, the participating users 204 may utilize a built-in camera and microphone within a user device, such as a smartphone, tablet, laptop computer, or desktop computer. In some such embodiments, the user device of each of the plurality of participant users may be communicatively coupled to the media server 202, for example, over a wireless network such as an internet connection.

In some embodiments, the communicative connection between the media server 202 and the plurality of participant users 204 may be bidirectional such that video and audio data is sent both from the participants and to the participants. For example, in some embodiments, individual video streams may be received from each of the participant users 204 and the individual video streams are then sent to the remaining participant users 204 such that each participant user 204 receives the individual video streams of all other participant users 204. In some embodiments, the video streams are sent between the plurality of participant users 204 and the media server 202 using a form of low latency communication such as WebRTC (Web Real-Time Communication).

In some embodiments, the media server 202 provides the plurality of individual video data streams from the respective plurality of participant users 204 to a mixing server 206. The mixing server 206 receives each of the individual video streams and mixes the plurality of individual video streams into a mixed video stream. In some embodiments, the mixing server 206 mixes a variety of additional information received from a variety of sources into the mixed video stream, as will be described in further detail below. In some embodiments, the mixing server 206 accesses a web page using a headless browser for performing one or more of rendering, recording, and mixing the video streams. Accordingly, embodiments are contemplated in which the mixing server 206 utilizes the headless browser to render the video streams in HTML (Hypertext Markup Language). In some embodiments, the mixing server 206 may change the layout of the video streams to emphasize content such as screen shares or active speakers. For example, embodiments are contemplated in which the mixing server 206 increases the size of a particular video stream in response to a participant user 204 actively speaking or a participant user 204 sharing their screen.

In some embodiments, an origin server 207 may be included which may be communicatively coupled to the mixing server 206. Accordingly, in some embodiments, the origin server 207 may receive the mixed video stream or one or more sets of other data from the mixing server 206. In some embodiments, the origin server 207 and the mixing server 206 may communicate over a representational state transfer (REST) architecture. In some embodiments, the one or more of the components of system 200 may communicate using Web APIs. Further, in some embodiments, may use any combination of a variety of communication techniques including REST, Webhooks, and publish-subscribe patterns, as well as other suitable communication means. Further, in some embodiments, a web application 209 may be included. Here, the web application 209 may be communicatively coupled to the origin server 207, as shown. The web application 209 may comprise an application running on a user device or server, for example, as a stand-alone application or from within a web browser. In some embodiments, the web application 209 is associated with a specific communication platform.

In some embodiments, a video storage server 208 may be included for storing one or more of the video streams. In some embodiments, the video storage server 208 may store at least a portion of the plurality of individual video streams and/or the mixed video stream. Accordingly, the video storage server 208 may be communicatively coupled to either or both of the media server 202 and the mixing server 206. As such, embodiments are contemplated in which the mixing server 206 mixes a plurality of video streams into a single mixed video stream and provides the mixed video stream to the video storage server 208 to store the mixed video stream. In some embodiments, the mixed video stream may be provided as a set of HTML code, including computer executable script objects, from the headless browser of the mixing server 206 such that the mixed video stream is stored as HTML code. As used herein, a headless browser is a web browser capable of rendering web content, including script content, without necessarily rendering an associated visual display. Such a headless browser may instead render a stream of video frames that may be persisted to a video file or otherwise streamed to a network connection or stored to a memory, such as a shared memory, whose contents may be consumed by another process with access to the shared memory.

In some embodiments, the video storage server 208 may store individual audio tracks or video files in different file formats. For example, a first video file may be stored as an MP4 file while a second video file may be stored as an AVI file. Further, video and audio data which was never shared to the viewing users 220 may additionally be stored such as altered tracks including noise reduced audio tracks, video streams with captions added or removed, and tracks including various other effects including background blur and other video filters. In some embodiments, a clean copy of the video stream and audio track may be stored by the video storage server 208. Additionally, or alternatively, tracks and files including various effects may be stored by the video storage server 208.

In some embodiments, a captioning server 210 may be included communicatively coupled to either or both of the media server 202 and the mixing server 206. In some such embodiments, the captioning server 210 may be configured to provide caption information for the video streams. In some embodiments, the captioning server 210 receives the video streams and identifies spoken natural language within the video streams. In some embodiments, the captioning server 210 may include natural language processing capabilities or interface with a natural language recognition service for recognizing spoken natural language and utterances within the audio data of the video streams. Accordingly, the captioning server 210 may provide captions to the video stream. In some embodiments, the video streams are sent to the captioning server 210 before mixing so that the captioning server 210 can provide captions to the video streams before mixing. Thus, embodiments are contemplated in which captions may be added before mixing and may be mixed into the mixed video stream such that the mixed video stream is a multi-media stream comprising video data, audio data, and corresponding caption data. Alternatively, in some embodiments, the captioning server 210 may provide caption data after mixing for example during post-processing of a video stream. In some such embodiments, the video streams may be time stamped such that the caption data is associated with a specific time within the video stream and can be added into the recorded video stream later.

In some embodiments, the mixing server 206 is also communicatively coupled to at least one integration host 212. In some embodiments, the integration host 212 may be used to integrate various additional features into the mixed video stream. For example, integrations may be used to include a virtual whiteboard which the plurality of participant users 204 can interact with. In some embodiments, the integration host 212 may be associated with a third-party service which may be integrated into the mixed video stream. Further, in some embodiments, the integration host 212 may be delivered in connection with HTML web page contents such that the integration is executed in a browser script interpreter engine. Accordingly, in some embodiments, both the integration and the video streams are rendered as web page HTML contents and can be easily combined and adjusted. In some embodiments, the integration host 212 may be an external integration server for generating integration information associated with at least one of the video streams.

In some embodiments, an authoring server 214 may be included for authoring, producing, and editing various features of the mixed video stream. Accordingly, the authoring server 214 may be communicatively coupled to the mixing server 206. In some embodiments, the authoring server 214 may be operated by a producer user. Embodiments are contemplated in which the authoring server 214 edits parameters of the video stream before, after, or during the mixing of the video streams. For example, in some embodiments, the authoring server 214 predefines a video template for the mixing server 206 which defines parameters for mixing of the video streams. Alternatively, in some embodiments, the authoring server 214 edits the video streams after recording and mixing in a post-production process. Further still, in some embodiments, the authoring server 214 may provide video instructions to the mixing server 206 in real-time to affect the video mixing process. In some embodiments, the authoring and production operations of the video streams may be carried out through any combination of manual and automated operations. For example, in some embodiments, predefined instructions may be provided to control the mixing process based on a variety of factors such as a number of participant users 204.

In some embodiments, a web hosting service or web host 216 may be accessed by the mixing server 206. For example, in some embodiments, a headless browser associated with the mixing server 206 may be used to access a web page which may be hosted by the web host 216. Accordingly, the web host 216 may provide access to the mixing server 206 to access a web page associated with the video stream. In some embodiments, the web page may be used to render the video stream in HTML. Further, embodiments are contemplated where the video stream may be published to the web page by the mixing server 206. Accordingly, users may be able to access the video stream by visiting the corresponding web page which, in some such embodiments, may require a form of authentication.

In some embodiments, HTML may be used to insert additional elements into the video stream to produce a mixed output. For example, any of banners, text, overlays, and effects, as well as other additional elements may be added to the video stream such that the final HTML rendering of the mixed output includes said additional elements. Here, said additional elements may be added in a pre-production stage for example within an HTML template or during a post-processing stage.

In some embodiments, the mixing server 206 provides the mixed video stream and/or one or more of the individual video streams to any number of edge servers 218. Alternatively, in some embodiments, the mixed video stream is provided to the edge servers 218 by the origin server 207. Accordingly, each of the edge servers 218 transmits the video stream to a respective plurality of viewing users 220. In some embodiments, it may be desirable to employ edge servers 218 to transmit video streams to users in remote locations (far from the mixing server 206). Accordingly, embodiments are contemplated where one or more edge servers 218 are utilized in remote locations to improve response times for remote users. Alternatively, or additionally, in some embodiments, the mixing server 206 may provide video streams directly to one or more viewing users 220.

In some embodiments, the mixing server 206 or the origin server 207 may provide the mixed video stream to one or more third party servers 222. In some such embodiments, the third-party servers 222 may be associated with third party streaming services such as YOUTUBE, FACEBOOK, and TWITCH. Accordingly, the third-party servers 222 may provide the mixed video stream to respective pluralities of viewing users 220. As such, embodiments are contemplated where various pluralities of viewing users 220 have access to the mixed video stream through various indirect or direct communication connections to the mixing server 206.

In some embodiments, each of the viewing users 220 may use a user device such as a smartphone, tablet, television, or personal computer to view the video stream. Accordingly, in some embodiments, either of the mixed video stream or the individual video streams may be generated for display within a graphical user interface on one of the user devices, as will be described in further detail below.

Figure 2B:
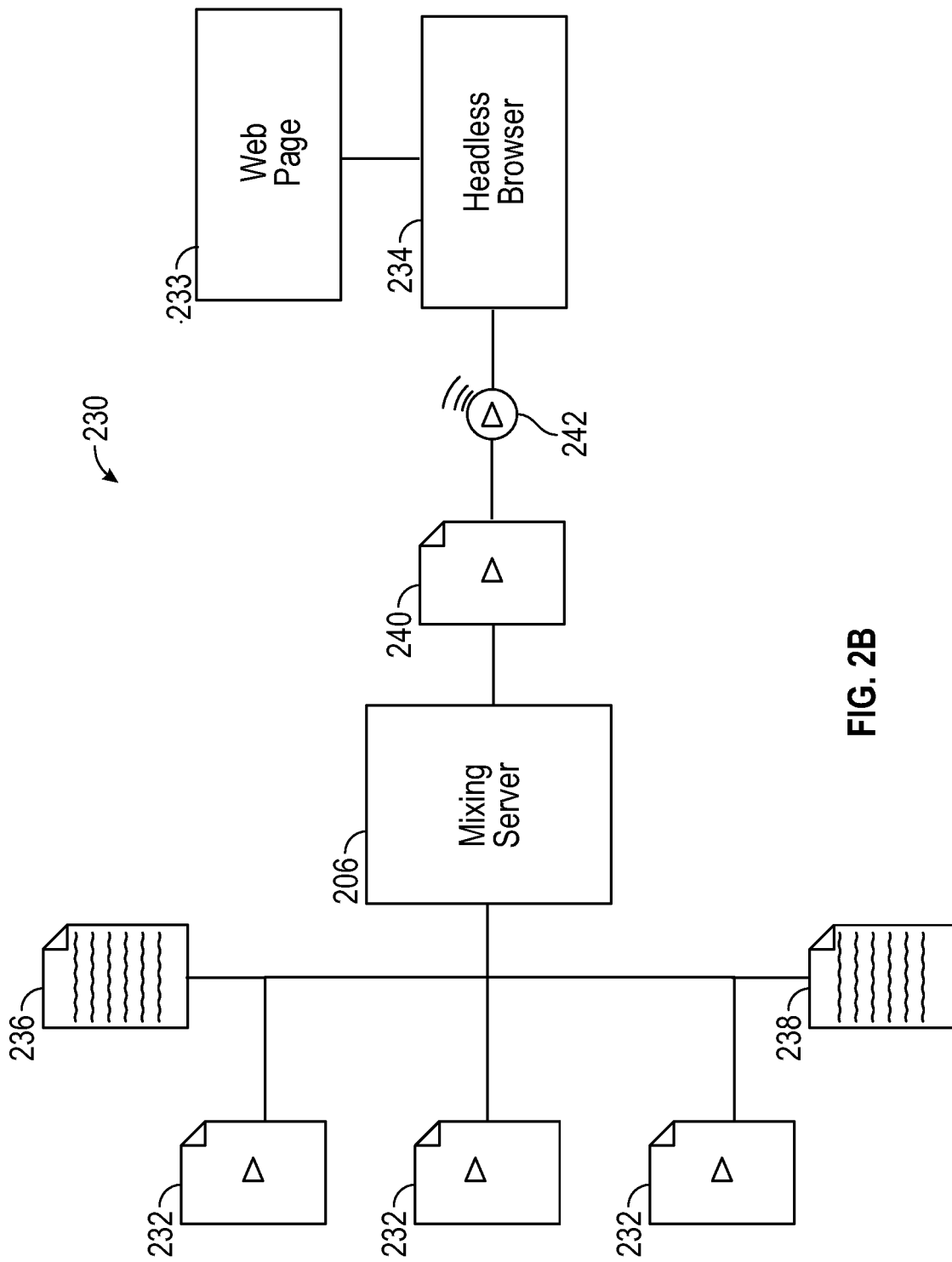
FIG. 2B depicts an exemplary video mixing system relating to some embodiments of the invention.

Turning now to FIG. 2B, an exemplary video mixing system 230 is depicted relating to some embodiments. In some embodiments, the video mixing system 230 includes a plurality of individual video streams 232 which may be received from a respective plurality of participant users 204, as described above. In some embodiments, the plurality of individual video streams 232 are received by the mixing server 206. In some embodiments, the mixing server 206 may also receive a set of caption data 236 which may be received from the captioning server 210, as described above. Further, in some embodiments, the mixing server 206 also receives a set of integration data 238 which may be received from the integration host 212.

In some embodiments, the mixing server 206 mixes at least a portion of the individual video streams 232 into a mixed video stream 240. In some embodiments, the caption data 236 and/or the integration data 238 may also be mixed into the mixed video stream 240. In some embodiments, the mixed video stream 240 may be recorded and stored, for example, using the video storage server 208. In some embodiments, at least a portion of the individual video streams 232 may also be stored using the video storage server 208. In some embodiments, the mixed video stream 240 may be transmitted as a streaming signal 242, as shown. For example, in some embodiments, the streaming signal 242 may be transmitted to edge servers 218 and third-party servers 222 over a wireless network such that the mixed video stream 240 may be viewed by various viewing users 220.

In some embodiments, the video streams 232, caption data 236, and integration data 238 are mixed using the mixing server 206 and provided as an already mixed stream to a web page 233, which may be accessible by the one or more viewing users 220. Accordingly, the viewing users 220 may access the video stream using a web browser to access the web page 233. Further, in some embodiments, a headless browser 234 accesses the web page 233 to receive the mixed video stream 240. In some embodiments, the headless browser 234 accesses the web page 233 as an additional member of the streaming session. Here, WebRTC credentials may be required to access the web page 233 and join the session such that only authorized viewers including the headless browser 234 have access to the web page 233. Accordingly, the headless browser 234 may capture and record the mixed video stream 240 from the web page 233 and store the mixed video stream 240, for example, within the video storage server 208. In some embodiments, the headless browser 234 records the entire web page 233, for example, including any banners or branding rendered on the web page 233. Additionally, in some embodiments, the headless browser 234 may publish the captured data including the web page 233 and the mixed video stream 240 to another subsequent web page such that the captured data is available to other users. For example, the headless browser 234 may publish to another web page to extend the number of viewers beyond typical viewing limits. Embodiments are contemplated in which any number of headless browsers may be included and subsequent headless browsers may access the subsequently produced web page to further extend access to the initial web page. Accordingly, any number of viewers will have access to the web page based on the number of headless browsers.

In some embodiments, the integration data 238 may comprise HTML code for rendering integration information from the integration host 212 associated with an integration web page. Accordingly, the integration data 238 can be easily combined into the mixed video stream 240. Further, in some embodiments, the presentation of the integration data 238 may be altered for example using the authoring server 214. For example, an authoring user may selectively change any of the appearance, the location, and the size of the integration data 238, as well as select a time in the mixed video stream 240 in which the integration data 238 is to appear. Accordingly, embodiments are contemplated in which an authoring user configures a first portion of the mixed video stream that includes the integration data 238 and a second portion of the mixed video stream that does not include the integration data 238. In one example, the integration data 238 includes information from a virtual whiteboard and is only included for a portion of the video stream.

Figure 3A:
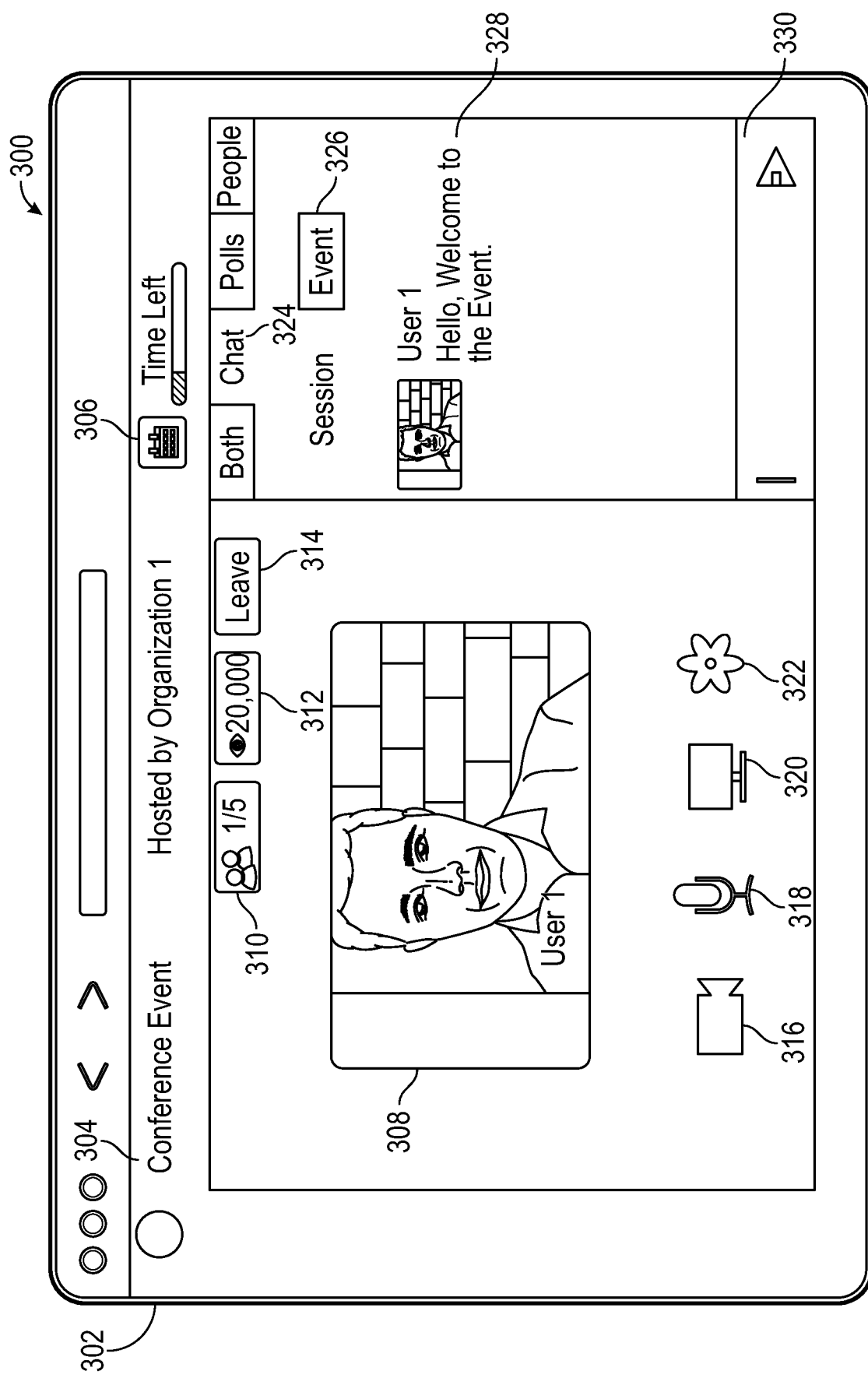
FIG. 3A depicts a graphical user interface including an event user interface relating to some embodiments of the invention.

Turning now to FIG. 3A, a graphical user interface 300 including an exemplary event user interface 302 is depicted relating to some embodiments. In some embodiments, the graphical user interface 300 may be accessed from within a web browser on a client device, as shown. Alternatively, in some embodiments, the graphical user interface 300 may be associated with a native application executing on a client device. In some embodiments, the event user interface 302 may be generated for display within a graphical user interface on a user device of any of the participant users 204 or the viewing users 220. In some embodiments, a similar event user interface 302 may be displayed to each of the participant users 204 and the viewing users 220. Alternatively, in some embodiments, the event user interface 302 may appear differently for different types of users. For example, participant users 204 may have the option to enable/disable their microphone using the event user interface 302 while the viewing users 220 may not have this option. Further, embodiments are contemplated in which a viewing user 220 may become a participant user 204 by enabling either of the user's microphone or camera from within the event user interface 302.

In some embodiments, it may be desirable for the event user interface 302 to provide a few-to-many communications environment, for example, allowing one user or a handful of users to give a speech or discuss a topic in front of thousands of viewing users. In one example, up to one hundred thousand viewing users may be included. Alternatively, in some embodiments, more or fewer users may be present. In some embodiments, the graphical user interface 300 receives an HTML output from the mixing server 206. In some embodiments, any of a variety of types of graphical user interfaces are contemplated for generating a graphical representation of the HTML output.

In some embodiments, the graphical user interface 300 includes an event title 304 for the event and a schedule interface object 306. In some embodiments, the schedule interface object 306 may be selected to access an event schedule for the event which may be predefined for the event and may be updated during the event. Additionally, in some embodiments, the schedule interface object 306 includes an indication of the time remaining for the event, as shown. For example, the indication of time remaining may show the progress of the event with respect to the total event time. The indication may appear as a progress bar, as shown, but may alternatively or additionally include the time remaining as an hour and minute value or as a percentage of the total time for the event.

In some embodiments, a video window 308 may be displayed on the event user interface 302, as shown, based on a received video stream for a respective user. In some embodiments, the video window 308 may be displayed based on the mixed video stream. Accordingly, the video window 308 may show video data captured by the respective user's camera. Additionally, included are one or more indicator objects, such as a participants indicator 310 indicating a number of active participants and a viewers indicator 312 indicating a number of viewers watching the composite video stream.

In some embodiments, an exit interface object 314 may be included, which may exit the event or the current video session in response to user actuation. As such, embodiments are contemplated where the exit interface object 314 may be used, for example, to leave a meeting, end a video stream, or disconnect from a video stream. Additionally, included on the graphical user interface 300 are a camera interface object 316, a microphone interface object 318, a screen interface object 320, and a settings interface object 322. In some embodiments, the camera interface object 316 and the microphone interface object 318 may be used to toggle activation of the user's camera and microphone respectively. Accordingly, a user may select the camera interface object 316 to stop sharing the user's video data and select the microphone interface object 318 to optionally mute the user's microphone.

The screen interface object 320 may be selected to share the user's screen. For example, embodiments are contemplated in which the screen interface object 320 switches the video data that is shared from the camera video data to the user's screen. Accordingly, the user may be able to share live video footage of the user's computer screen or a screen from another user device with the other participant users 204 and viewing users 220. Further, embodiments are contemplated in which the user may simultaneously share the user's screen and video data from the user's camera. Further still, in some embodiments, the screen interface object 320, when selected, presents the user with options for selecting which specific screen or window to share, for example, where the user has multiple screens and application windows open at once.

The settings interface object 322, when selected, may present the user with a set of options to change various settings associated with the event, the video streaming service, and the graphical user interface 300. For example, in some embodiments, the settings interface object 322 allows the user to adjust various settings such as, switching the active input devices and output devices for audio and video, change microphone monitoring settings, change output volume, adjust video quality, and other related settings.

In some embodiments, the graphical user interface 300 further includes one or more selectable tabs 324, such as, for example, a booth tab, a chat tab, a polls tab, and a people tab, as shown. Here, the booth tab may be used to provide a plurality of virtual booths allowing individuals or organizations to present relevant event information. In some embodiments, the chat tab may be used to provide a messaging environment for various users, as will be described in further detail below. The polls tab may provide a way for users to give answers to polling questions. For example, a participant user may present a polling question such that the viewing users 220 can access the polls tab to provide answers to the polling question. The results of the polling may then be forwarded to the participant user or may be available to the viewing users 220 after a polling time has expired or once every user has answered the polling question. The people tab may be selected to present information about the people in the event or in a specific session. In some embodiments, the people tab may include biography information and contact information for each speaker at the event.

In some embodiments, the graphical user interface 300 may further include a viewing option interface object 326, which may be used to select the viewing option that is displayed in the graphical user interface 300. For example, a user may select between an event option and a session option, as will be described in further detail below. In some embodiments, the event option may be selected to view a main stage of an event and the session option may be selected to view a breakout session of the event.

In some embodiments, a messaging window 328 may be included allowing users to communicate via textual messages or multimedia messages. Accordingly, the messaging window 328 may present a plurality of user messages from various users. Embodiments are contemplated in which both participant users 204 and viewing users 220 are able to interact within the messaging window 328. Alternatively, in some embodiments, the messaging window 328 may be restricted to participant users 204 or to specific users. Additionally, a message input interface object 330 may be included allowing the user to compose and send a message to be posted in the messaging window visible to other users. In some embodiments, the messages may include any of textual communications or file attachments, reactions, emojis, and other types of message communications.

Figure 3B:
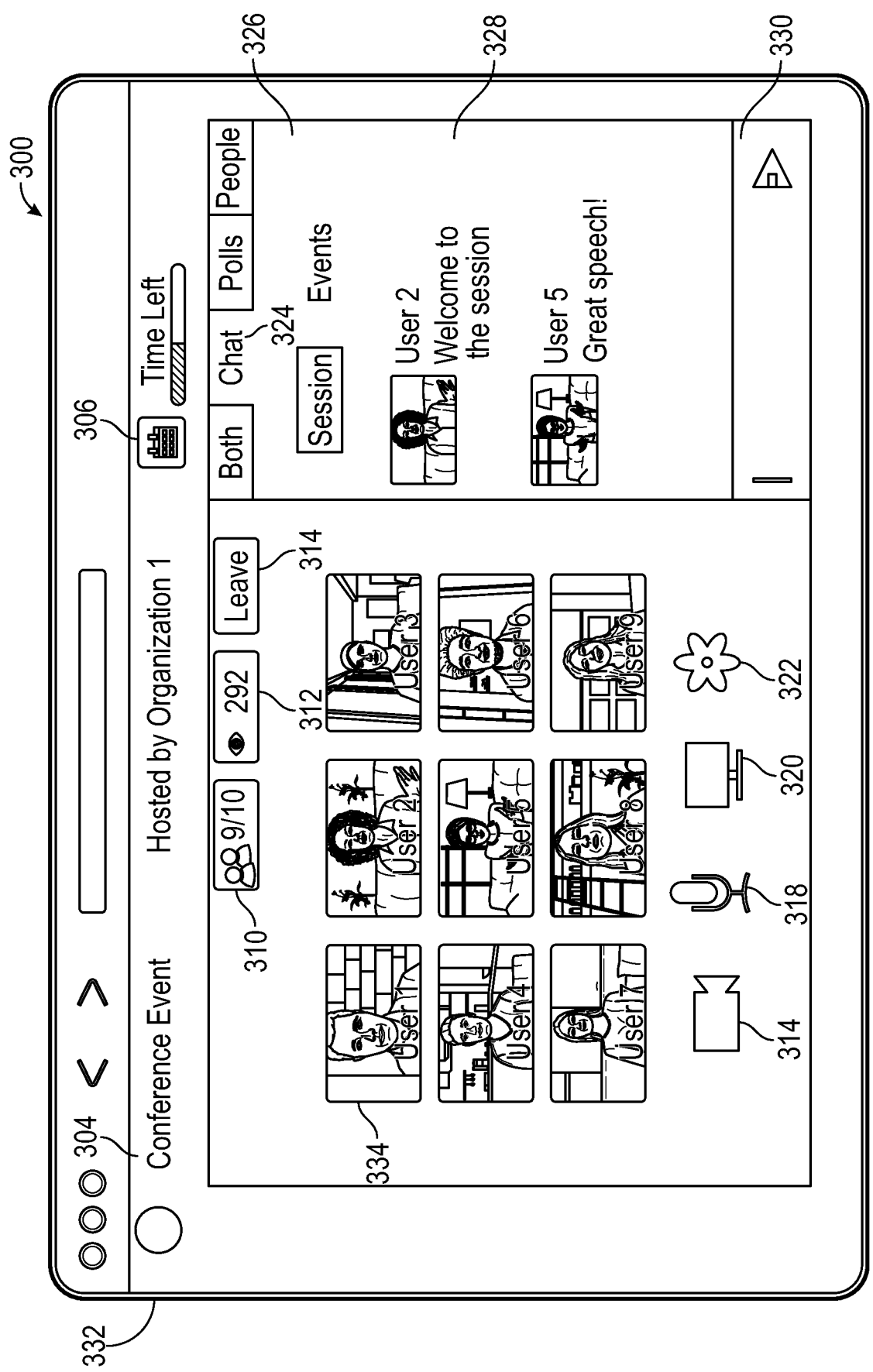
FIG. 3B depicts a graphical user interface including a session user interface relating to some embodiments of the invention.

Turning now to FIG. 3B, the graphical user interface 300 including an exemplary session user interface 332 is depicted relating to some embodiments. In some embodiments, the session user interface 332 may be accessed by selecting the session option of the viewing option interface object 326. In some embodiments, the session user interface 332 may be associated with a breakout session of the event. For example, in some embodiments, the users of an event may be divided out into a plurality of sessions. Accordingly, sessions may provide a virtual environment for users to talk amongst themselves resulting in a more personal experience. Embodiments are contemplated where one to five speaker users present a topic to thousands of viewers in an event stage and then the users are separated into a plurality of sessions to discuss the topic and ask questions about the topic.

In some embodiments, the session user interface 332 includes a plurality of video windows 334 each associated with an individual video stream of a respective user. In some embodiments, the video windows 334 may be included as part of the mixed video stream. For example, embodiments are contemplated in which the mixing server 206 mixes a plurality of individual video streams into a mixed video stream including the plurality of video windows 334. Accordingly, the mixing server 206 may be able to edit and apply layout changes to adjust the presentation of the video windows 334 within the graphical user interface 300. In some embodiments, up to twenty video windows 334 may be included on the graphical user interface 300 at a time such that the windows may be displayed at a reasonable size. Alternatively, in some embodiments, more or fewer video windows 334 may be included. Further still, in some embodiments, the size of the video windows may be adjusted based at least in part on the number of users and/or user activity. For example, in some embodiments, it may be desirable to automatically adjust the size of at least one of the video windows based on determining that a participant user is actively speaking.

In one example, the session user interface 332 is used by a group of participant users to discuss a topic associated with an event. Accordingly, users 1-9 may be joined into a session group such that the video streams of each user are shared directly with the other users, for example, using a web real-time transport protocol (RTP). In some embodiments, a plurality of viewing users 220 may tune in to view the discussion, as denoted by the viewers indicator 312 indicating the number of viewing users 220. Accordingly, in such embodiments, the individual video streams of participant users 1-9 are mixed into a mixed video stream and provided to the plurality of viewing users 220. In some embodiments, the video streams may be mixed and rendered on a web page by a headless browser of the mixing server 206. Embodiments are contemplated in which a first communication protocol is used for receiving individual video streams from the plurality of participant users 204 and a second communication protocol distinct from the first is used for providing the mixed video stream 240 to the plurality of viewing users 220.

Figure 3C:
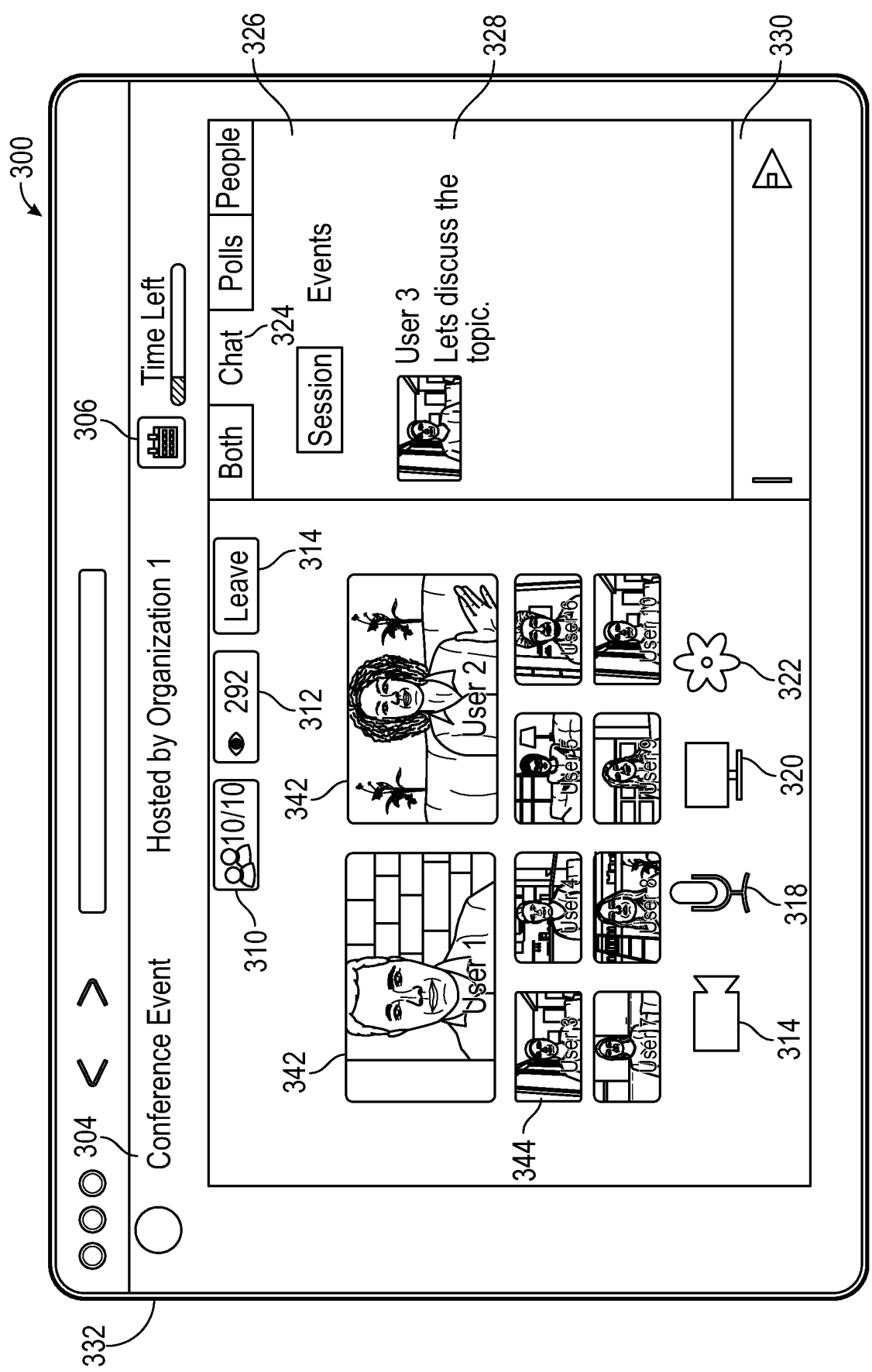
FIG. 3C depicts a graphical user interface including an adjusted user interface relating to some embodiments of the invention.

Turning now to FIG. 3C, an exemplary adjusted variation of user interface 300 is depicted relating to some embodiments. In some such embodiments, the adjusted user interface 300 may be generated for display on the graphical user interface 300 based on one or more of the video streams from the mixing server 206. In some embodiments, the mixing server 206 may determine at least one layout adjustment for the adjusted user interface 300 based at least in part on a number of participant users 204 or user activity. For example, in some embodiments, the mixing server 206 may determine that the number of participant users exceeds a maximum threshold. Here, the mixing server 206 may remove video streams of one or more inactive users or may reduce the size of the video windows for these users. In some embodiments, such adjustments may be based on a predefined video template including a predetermined video layout. Accordingly, in some embodiments, the removed video streams may not be mixed into the mixed video stream. In some embodiments, an individual video stream may be removed from the mixed video stream based on a determination that a given participant user has not been active for a predetermined duration of time. For example, embodiments are contemplated in which a user's video stream is removed if the user has not spoken for more than a predetermined threshold period of time such as, for example, 30 seconds.

In some embodiments, it may be desirable to adjust the size of the video windows in the graphical user interface 300 based at least in part on user activity or the predefined video layout. Accordingly, in some embodiments, one or more larger video windows 342 may be included with a plurality of smaller video windows 344, as shown. In one example, two larger video windows 342 may be included for two participant users 204 who are actively speaking. Here, the size of the video windows for the remaining participant users may be reduced, as shown, to the plurality smaller video windows 344. In some embodiments, the size of the video windows may be determined based at least in part on user activity, such as a user actively speaking or a user remaining silent. In some embodiments, a first-in-first-out technique may be used to determine the video window layout in which a queue is generated of recently active users. For example, embodiments are contemplated in which video windows for a queue including the last four users to speak are generated for display in the graphical user interface 300. Here, when a new user speaks, the new user's video window is added to the queue, displayed, and the video window of the user who has not spoken most recently is replaced and removed from the queue. However, it should be understood that such a first-in-first-out technique may be used to display any number of video windows.

In some embodiments, at least a portion of the graphical user interface 300 may be generated for display on a user device to a viewing user 220 based at least in part on the mixed video stream 240. Accordingly, embodiments are contemplated in which the graphical user interface 300 may be generated for display within a web browser on a user device associated with a web page. In some such embodiments, the headless browser 234 renders the mixed video stream 240 for display on the web page such that the mixed video stream 240 is accessible to viewing users 220.

Figure 4:
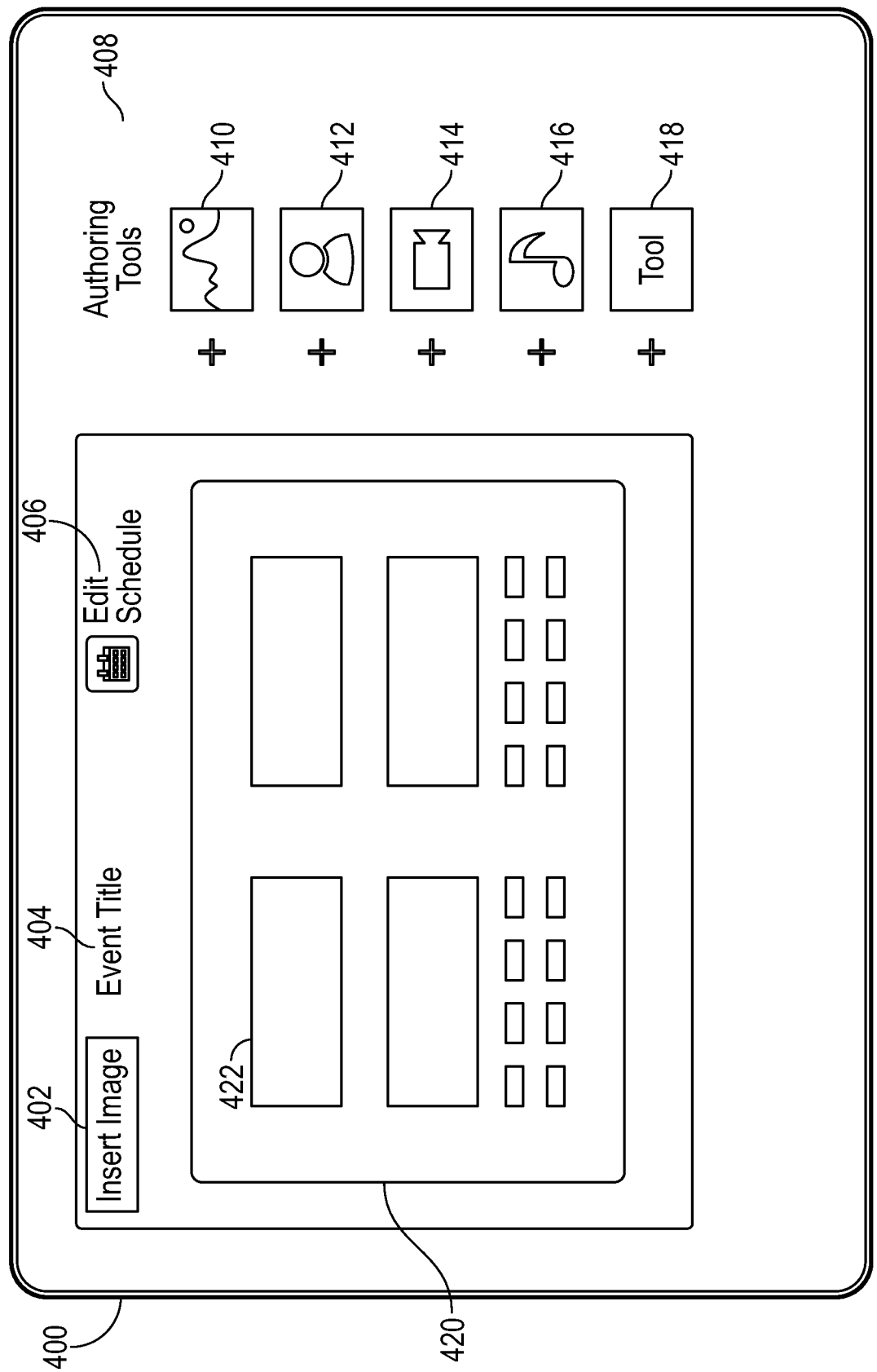
FIG. 4 depicts an authoring user interface relating to some embodiments of the invention.

Turning now to FIG. 4, an exemplary authoring user interface 400 is depicted relating to some embodiments. In some such embodiments, the authoring user interface 400 may be used to edit various settings and parameters on the graphical user interface 300 and within the video streams. For example, in some embodiments, the authoring user interface 400 may be used to adjust the layout of video windows 308 on the graphical user interface 300. In some embodiments, the authoring user interface 400 may be associated with the authoring server 214. For example, the authoring user interface 400 may be hosted on the authoring server 214.

It should be understood that, in some embodiments, the authoring user interface 400 may be used to manage the graphical user interface 300 before, during, or after the video stream is recorded and/or streamed. For example, embodiments are contemplated in which the authoring user interface 400 is used to generate a video layout template before any of the individual video streams are captured. Alternatively, in some embodiments, the authoring user interface 400 may be used to change the layout of the video streams as they are recorded. Further still, in some embodiments, the authoring user interface 400 may be used to apply post-processing techniques to alter the presentation of the video streams after they have been recorded.

In some embodiments, the authoring user interface 400 includes a logo object 402 which may be selected to insert a logo image into the graphical user interface 300. For example, in some embodiments, an authoring user may select a company logo or another image associated with the event for the logo image. Additionally, the authoring user interface 400 may include an event title object 404 which may be used to insert or edit an event title 304 for the event. In some embodiments, the authoring user interface 400 may include an edit schedule object 406 for producing and editing an event schedule for the event. For example, in some embodiments, when an authoring user selects the edit schedule object 406 a schedule selection page may be expanded allowing the authoring user to generate a schedule or to revise an existing schedule.

In some embodiments, the authoring user interface 400 includes an authoring tools section 408 including a plurality of authoring tools for adjusting various parameters of the graphical user interface 300. In some embodiments, the authoring tools include an image tool 410, a video window tool 412, a video streaming tool 414, an audio tool 416, and an additional tool 418. In some such embodiments, the image tool 410 may be selected to insert an image into the graphical user interface 300 or to apply a filter to an existing image or to a video stream. In some embodiments, the video window tool 412 may be used to adjust a size or position of a video window within the graphical user interface 300 or to add an additional video window. In some embodiments, the video streaming tool 414 may be used to add, remove, or select a video stream, which may be any of the mixed video stream or one of the individual video streams. In some embodiments, the audio tool 416 may be used to insert or remove audio from the graphical user interface 300. For example, embodiments are contemplated in which the authoring user selects a song to be played in the background of one or more of the video streams.

The additional tool 418 may be any of a variety of different tools for authoring and manipulating video content. In some embodiments, the additional tool 418 may be used to further rearrange the various interface objects of the graphical user interface 300. In one example, the additional tool 418 may be used to add information associated with an integration to the graphical user interface 300. Additionally, or alternatively, the additional tool 418 may be used to add captions for one or more of the video streams from the captioning server 210.

In some embodiments, the authoring user interface 400 includes video window display object 420 to show a graphical representation of the video windows 308 in the graphical user interface 300. In some embodiments, one or more video window indicators 422 may be included in the video window display object 420 showing the sizing and positioning of the video windows to be included in the graphical user interface 300. Accordingly, embodiments are contemplated in which an authoring user interacts with the video window display object 420 to resize and rearrange the video windows. For example, the authoring user may be able to drag and drop the video window indicators 422 to reposition video windows within the graphical user interface 300.

In some embodiments, the authoring user interface 400 may be used to generate a video layout template in HTML which may be used by the headless browser 234 of the mixing server 206 to render the video streams on a web page. Accordingly, the layout may be easily altered and rearranged to suit various numbers of participant users and viewing users. For example, embodiments are contemplated in which the layout template determines a video layout based on the number of active participant users. Accordingly, because the video streams are rendered in HTML format the video streams do not need to be decoded multiple times and the layout of the video streams can be easily adjusted.

In some embodiments, the authoring user interface 400 may be used during post-processing, for example, to allow the authoring user to select between a plurality of pre-recorded video streams to be mixed. Accordingly, the authoring user may review video data from a past event to produce a mixed video stream to be shared or published after the event. Here, the authoring user may add various additional components to the mixed video stream 240, such as special effects, transitions, filters, and image adjustments, which may help communicate additional information through the mixed video stream 240 and increase the production value of the mixed video stream 240.

Figure 5:
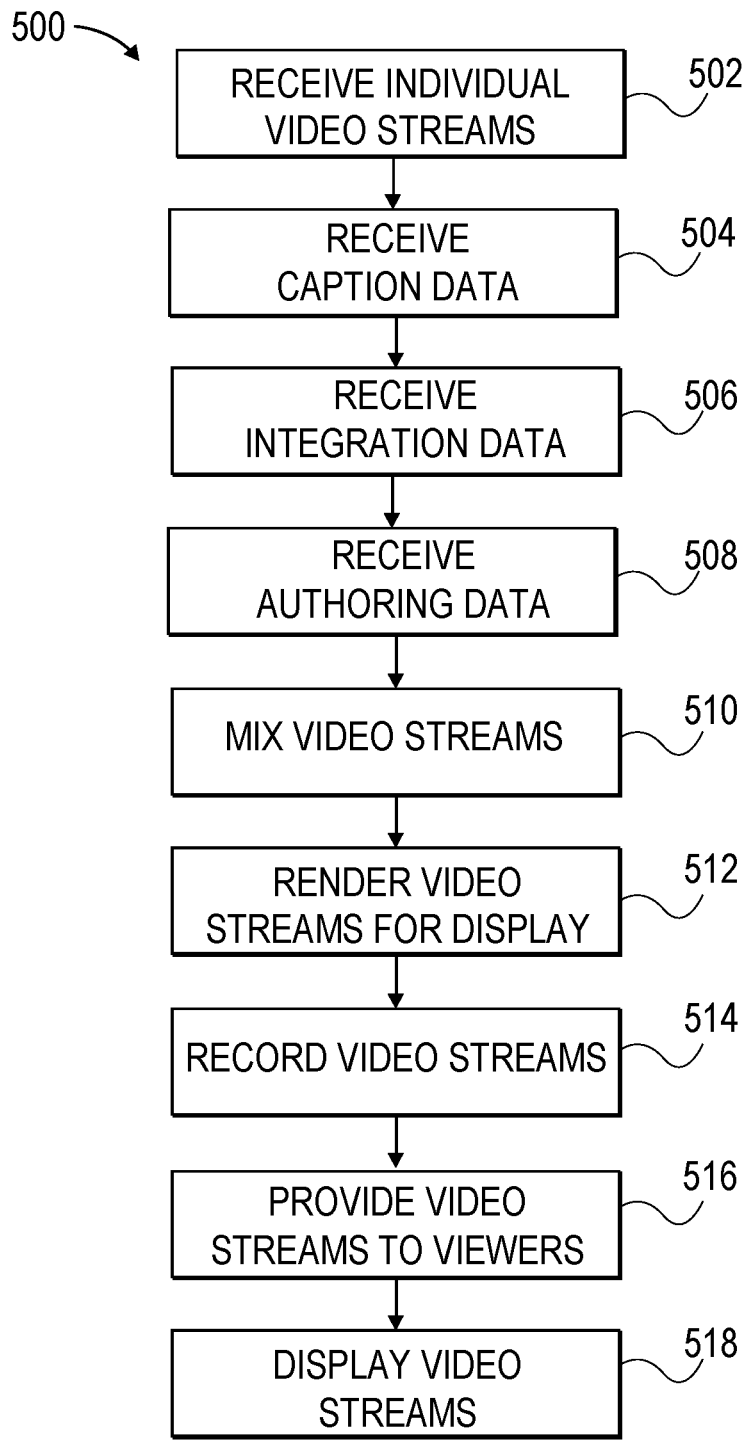
FIG. 5 depicts an exemplary method for producing a video stream relating to some embodiments of the invention.

Turning now to FIG. 5, an exemplary method 500 for producing a video stream is depicted relating to some embodiments. In some embodiments, at least a portion of the steps of the method may be executed on a processor such as a processor on the mixing server 206 or the media server 202. Further, in some embodiments, steps of the method may be divided between multiple components, for example, a first portion of the steps may be carried out on the media server 202 and a second portion of the steps may be carried out on the mixing server 206.

At step 502 the plurality of individual video streams 232 are received. In some embodiments, the individual video streams 232 may be received onto the mixing server 206 including the headless browser 234. At step 504 caption data 236 may be received from the captioning server 210. In some embodiments, the caption data 236 corresponds to at least one of the individual video streams 232 and is received onto the mixing server 206. At step 506 integration data 238 may be received from the integration host 212. In some embodiments, each of the caption data 236 and the integration data 238 are received by the headless browser 234 along with the plurality of individual video streams 232. Alternatively, in some embodiments, steps 504 and 506 may be skipped and the caption data 236 and integration data 238 are not received. Further, in some embodiments, the authoring user may configure settings within the authoring user interface 400 to determine whether to include either of the caption data 236 and the integration data 238.

At step 508 authoring data may be received from the authoring server 214. In some embodiments, the authoring data includes a video layout template which may include HTML code for rendering one or more video streams in a web browser. In some embodiments, the authoring data may be received earlier or later in the video production process. For example, in some embodiments, the authoring data may be received before the video streams. Additionally, in some embodiments, the authoring data may be received after the video streams are captured and may be applied as post-processing.

At step 510 at least a portion of the plurality of individual video streams 232 are mixed into the mixed video stream 240. In some embodiments, one or more of the caption data 236 and the integration data 238 are mixed into the mixed video stream 240. Accordingly, embodiments are contemplated in which the mixed video stream 240 is a multimedia data stream including one or more of video image data, audio data, textual data, and metadata. Additionally, in some embodiments, the mixed video stream 240 may include one or more timestamps for synchronizing the mixed video data of the mixed video stream 240 with other data. For example, in some embodiments, the caption data may be received after the video streams are mixed. Here, timestamps within each of the video data and the caption data may be compared to synchronize the data. Accordingly, the caption data 236 may be added after mixing during post-processing.

In some embodiments, the video streams may be mixed based at least in part on the received authoring data including video layout information. Accordingly, embodiments are contemplated in which the authoring user may change the presentation style and select between the various video streams to determine how the video streams are to be mixed. For example, the authoring user may configure the video layout information such that only two video streams appear at any given time showing the most recently active participant users. Additionally, the authoring user may add audio clips to the mixed video stream and may set up various integrations to be included in the mixed video stream 240.

At step 512 one or more of the individual video streams 232 or the mixed video stream 240 are rendered for display. In some embodiments, the video streams may be rendered in HTML format on a web page using the headless browser 234. Alternatively, in some embodiments, other formats may be used to render one or more of the video streams. In some embodiments, the video streams are rendered based at least in part on the video layout information which may be received from the authoring server 214. At step 514 the video streams are recorded. In some embodiments, the mixed video stream 240 may be recorded in HTML format. Further, in some embodiments, one or more of the video streams may be recorded in a video file format such as MP4 and stored on using the video storage server 208.

At step 516 the video streams are provided to the viewing users 220. In some embodiments, the mixed video stream 240 may be shared to viewing users 220 via the edge servers 218. Alternatively, in some embodiments, the mixed video stream 240 may be sent to the viewing users 220 directly from the mixing server 206. Further, in some embodiments, the mixed video stream 240 may be shared using third-party servers 222 of one or more third-party streaming services. Further still, in some embodiments, the mixed video stream 240 may be published to a web page such that the viewing users 220 can access the web page using a web link to view the mixed video stream 240. At step 518 at least one of the mixed video stream 240 or the individual video streams 232 are generated for display within graphical user interface 300, as shown in FIGS. 3A-C. Here, in some embodiments, the video streams may be displayed based at least in part on the video layout information, as described herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for producing a composite video stream, the method comprising:
   receiving a plurality of individual video streams associated with a respective plurality of participant users from a media server;
   mixing the plurality of individual video streams into a mixed video stream using a mixing server, the mixing server including a headless browser for accessing a web page;
   providing the mixed video stream including the plurality of individual video streams to a plurality of viewing users via one or more edge servers;
   generating for display in a graphical user interface one or more video streams of the plurality of video streams based on a predefined video template, the predefined video template comprising a Hypertext Markup Language (HTML) layout; and
   adjusting the HTML layout based at least in part on a number of participant users in the plurality of participant users.

2. The method of claim 1, wherein the graphical user interface comprises an interface object corresponding to each respective individual video stream of the plurality of individual video streams.

3. The method of claim 2, wherein the predefined video template is received from an authoring server communicatively coupled to the mixing server.

4. The method of claim 1, further comprising:
   rendering, using the headless browser, one or more of the plurality of video streams on the web page; and
   recording the plurality of individual video streams and the mixed video stream.

5. The method of claim 4, further comprising providing the mixed video stream to one or more third party streaming services.

6. The method of claim 1, further comprising adjusting the HTML layout to increase a size of a video stream of the plurality of individual video streams based on an indication that a user associated with the video stream is active.

7. The method of claim 1, further comprising:
generating a queue of recently active users; and
further adjusting the HTML layout based on the queue of recently active users.

8. One or more non-transitory computer-readable media storing computer-executable instructions that, when executed by a processor, perform a method for producing a composite video stream, the method comprising:
receiving a plurality of individual video streams associated with a respective plurality of participant users from a media server;
mixing the plurality of individual video streams into a mixed video stream using a mixing server, the mixing server including a headless browser for accessing a web page;
providing the mixed video stream including the plurality of individual video streams to a plurality of viewing users via one or more edge servers; and
generating for display in a graphical user interface one or more video streams of the plurality of video streams based on a predefined video template, the predefined video template comprising a Hypertext Markup Language (HTML) layout.

9. The media of claim 8, further comprising:
rendering, using the headless browser, one or more of the plurality of video streams on the web page; and
recording the plurality of individual video streams and the mixed video stream.

10. The media of claim 9, further comprising adjusting the HTML layout based at least in part on a number of participant users in the plurality of participant users.

11. The media of claim 10, further comprising:
receiving a communication from an authoring server, the authoring server associated with an authoring graphical user interface,
wherein the communication is indicative of a user input to the authoring graphical user interface of the authoring server; and
further adjusting the HTML layout based at least in part on the user input.

12. The media of claim 8, further comprising:
providing one or more audio streams associated with the plurality of individual video streams to a captioning server for generating caption information based on the one or more audio streams;
receiving the caption information from the captioning server; and
combining the caption information into the mixed video stream.

13. The media of claim 12, further comprising:
receiving integration information from an external integration server, the integration information associated with at least one of the plurality of individual video streams; and
combining the integration information into the mixed video stream.

14. The media of claim 8, further comprising:
responsive to determining that a participant user of the plurality of participant users has not been active for a predetermined duration of time, removing an individual video stream from the plurality of individual video streams from the mixed video stream, the individual video stream associated with the participant user.

15. One or more non-transitory computer-readable media storing computer-executable instructions that, when executed by a processor, perform a method for producing a video stream, the method comprising:
receiving a plurality of individual video streams associated with a respective plurality of participant users from a media server;
mixing at least a portion of the plurality of individual video streams into a mixed video stream using a mixing server, the mixing server including a headless browser for accessing a web page;
rendering, using the headless browser, one or more of the plurality of individual video streams on the web page;
recording the plurality of individual video streams and the mixed video stream;
providing the mixed video stream including the plurality of individual video streams to a plurality of viewing users via one or more edge servers; and
generating for display in a graphical user interface one or more video streams of the plurality of video streams based on a predefined video template, the predefined video template comprising a Hypertext Markup Language (HTML) layout.

16. The media of claim 15, further comprising adjusting the HTML layout based at least in part on a number of participant users in the plurality of participant users.

17. The media of claim 16, wherein a first communication protocol is used for receiving the plurality of individual video streams and a second communication protocol, distinct from the first, is used for providing the mixed video stream.

18. The media of claim 17, wherein the first communication protocol is a real-time transport protocol and the second communication protocol is a real-time messaging protocol.

19. The media of claim 18, wherein the plurality of participant users communicate directly with one another by sharing the plurality of individual video streams using the real-time transport protocol.

20. The media of claim 15, further comprising selecting one or more individual streams of the plurality of individual video streams to include in the portion of the plurality of individual video streams to be combined in the mixed video stream based at least in part on user activity.

* * * * *